United States Patent [19]

Levesque

[11] Patent Number: 5,527,039
[45] Date of Patent: Jun. 18, 1996

[54] GOLF SWING TRAINING AID

[76] Inventor: Claude A. Levesque, 20 rue Temis, St-Jacques, New Brunswick, Canada, E0L 1K0

[21] Appl. No.: 360,061

[22] Filed: Dec. 20, 1994

[30] Foreign Application Priority Data

Feb. 21, 1994 [CA] Canada ................................. 2116059

[51] Int. Cl.⁶ .................................................. A63B 69/36
[52] U.S. Cl. ........................... 473/226; 403/316; 473/256
[58] Field of Search ............................ 273/163 R, 163 A, 273/186.1, 186.2, 187.4, 187.5, 187.6, 193 R, 194 R, 165, 81 D, 81.2; 403/316, 317, 318, 319, 386

[56] References Cited

U.S. PATENT DOCUMENTS

| | | | |
|---|---|---|---|
| 2,771,678 | 11/1956 | Hansen, Sr. | 273/163 A |
| 3,273,892 | 9/1966 | Nolting | 273/163 A |
| 3,360,268 | 12/1967 | Molinari . | |
| 3,562,707 | 2/1971 | Orr | 403/386 |
| 3,565,444 | 2/1971 | LaRocca | 273/186 R |
| 3,680,870 | 8/1972 | Burnett et al. . | |
| 4,052,075 | 10/1977 | Daly | 273/171 |
| 4,598,911 | 7/1986 | Lepera | 273/186.2 |
| 4,647,045 | 3/1987 | Bilyeu | 273/163 A |
| 4,884,813 | 12/1989 | Cates | 273/163 A |
| 4,949,971 | 8/1990 | Thornton . | |
| 4,953,867 | 9/1990 | Rigsby . | |
| 5,178,394 | 1/1993 | Tanampai . | |
| 5,184,825 | 2/1993 | Ruth | 273/186.2 |
| 5,303,925 | 4/1994 | Rawson | 273/186.2 |

*Primary Examiner*—Steven B. Wong
*Attorney, Agent, or Firm*—Browdy and Neimark

[57] ABSTRACT

The invention relates to a golf training aid to be used in combination with a golf club to assist in the visualizing of the action of the golf club head during the arc of a golf swing. The training aid is adapted to be attached to the shaft of the golf club so as to maintain the club head in the proper position during the arc of a swing. The device includes a body block and attachment portion for removable securement to a golf club shaft by sliding gate and lock means. The body block has a flat surface and is positioned at 90° to the golf club head, acting as a level to help maintain the club head in a proper position throughout the arc of a golf club swing, thereby maintaining the club head in a proper position for striking a golf ball. A rubber plug secures the attachment means to the golf club so as to prevent slipping or movement of the training aid during a golf club swing.

5 Claims, 3 Drawing Sheets

GOLF SWING TRAINING AID

FIELD OF THE INVENTION

This invention relates to a golf aid and more particularly to an aid to improve a golfer's swing.

BACKGROUND OF THE INVENTION

This invention relates to a golf swing training aid adapted to work as a level which is removably secured to the shaft of a golf club, thereby providing a golfer with a means of visualizing the club face and thereby maintaining the club face in a proper position during the arc of a golf swing for striking a golf ball.

A number of patents have addressed the problem of, maintaining a golf club head in a proper position during the arc of a swing for striking of a golf ball. U.S. Pat. Nos. 4,953,867 and 4,949,971 are addressed to the problem of aligning a putting stroke. U.S. Pat. Nos. 5,178,394 and 3,680,870 teach weight devices adapted to be attached to a golf club shaft to assist in balancing of a golf club during a swing. U.S. Pat. No. 3,360,268 teaches a device adapted to be attached to a golf club head to assist in maintaining the proper golf head direction.

The device of the present invention is adapted to be removably fastened to the shaft of a golf club intended to be swung in an arc i.e. not a putter, thereby providing the golfer with a means of visualizing the orientation of a golf club face and thereby assisting in maintaining the golf club face in a proper position during the stroke attitude for striking a golf ball "head-on". The device can be used during practice swings to improve a golfer's swing arc thereby improving the golfer's contact with the golf ball.

The device is capable of being attached to the shaft of either an iron or wood golf club. It can be conveniently carried in a golfer's pocket or a golf bag when not in use.

SUMMARY OF THE INVENTION

The device of this invention relates to a golf swing training aid, for providing a visual means for properly aligning a golf stroke attitude and golf swing arc, comprising a main body block, a locking assembly for removable securement of the training aid to a golf club shaft, said body block comprising a flat usually forward facing surface, positioned so as to be at a 90° angle to the ball striking surface of a golf club head.

BRIEF DESCRIPTION OF THE DRAWINGS

The invention is illustrated by way of example in the accompanying drawings in which.

DETAILED DESCRIPTION OF THE PREFERRED EMBODIMENT

Figure 1:
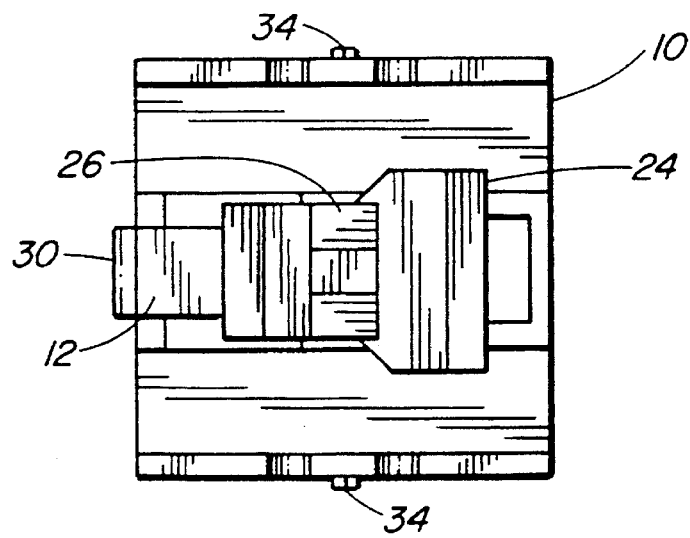
FIG. 1 shows a perspective plan view.
Figure 2:
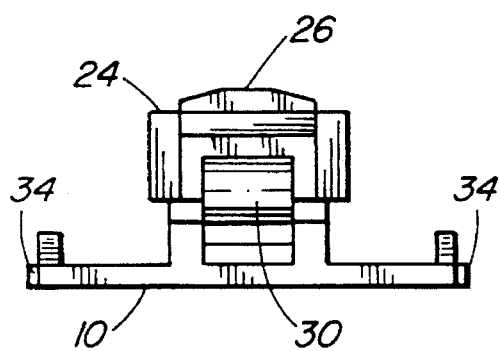
FIG. 2 shows a perspective rear view.
Figure 3:
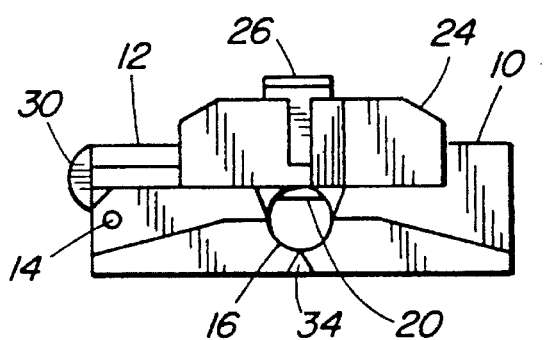
FIG. 3 shows a perspective side view.
Figure 4:
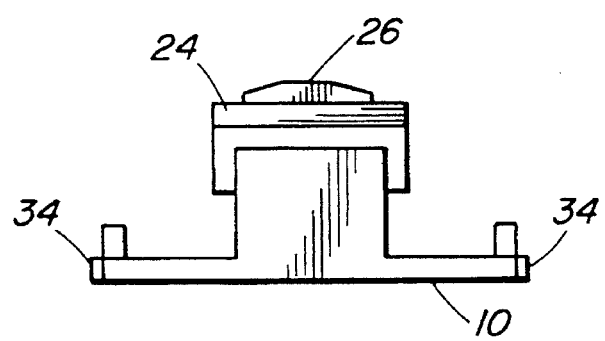
FIG. 4 shows a perspective front view.
Figure 5:
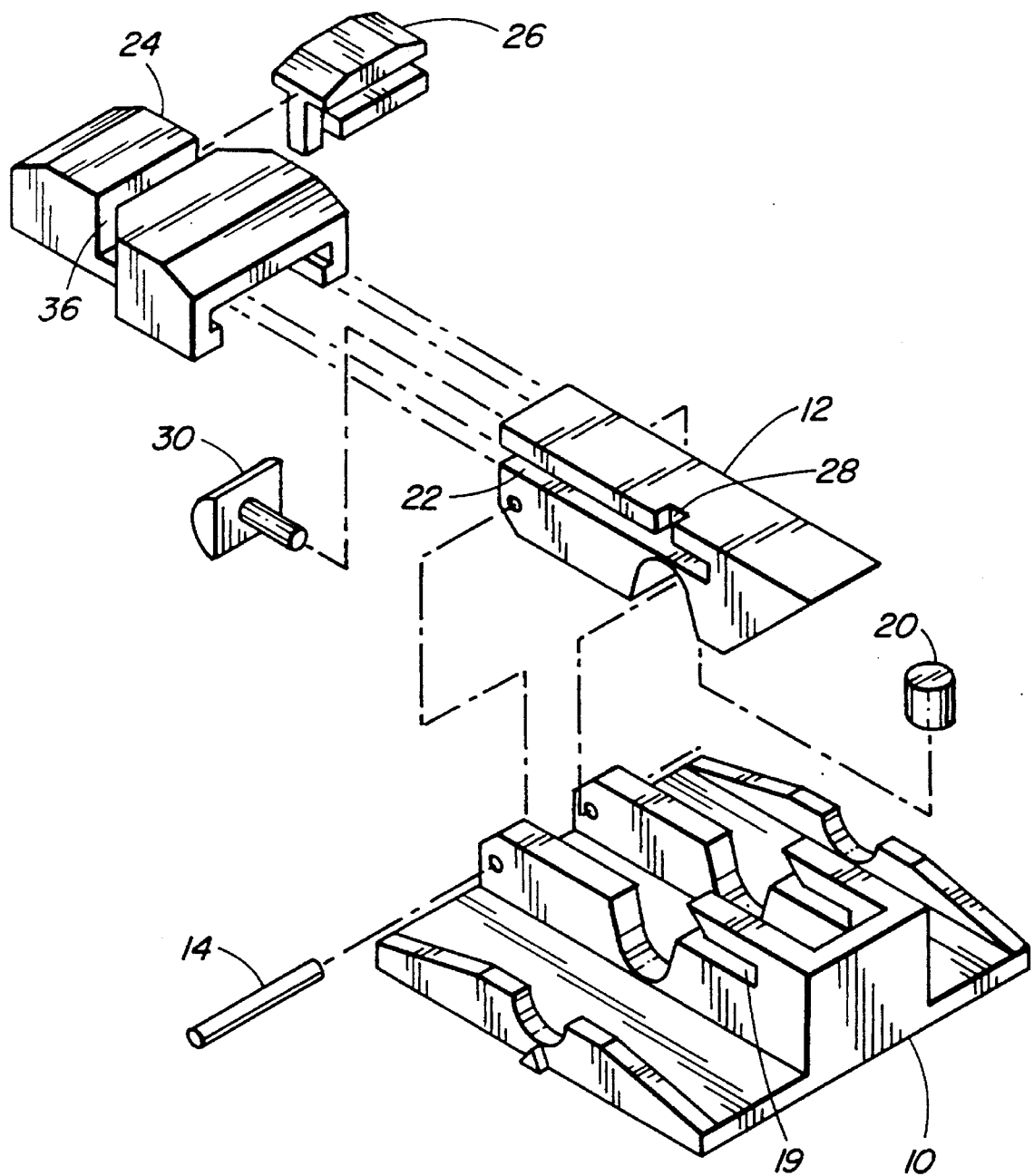
FIG. 5 shows an exploded perspective view of the golf training aid.
Figure 6:
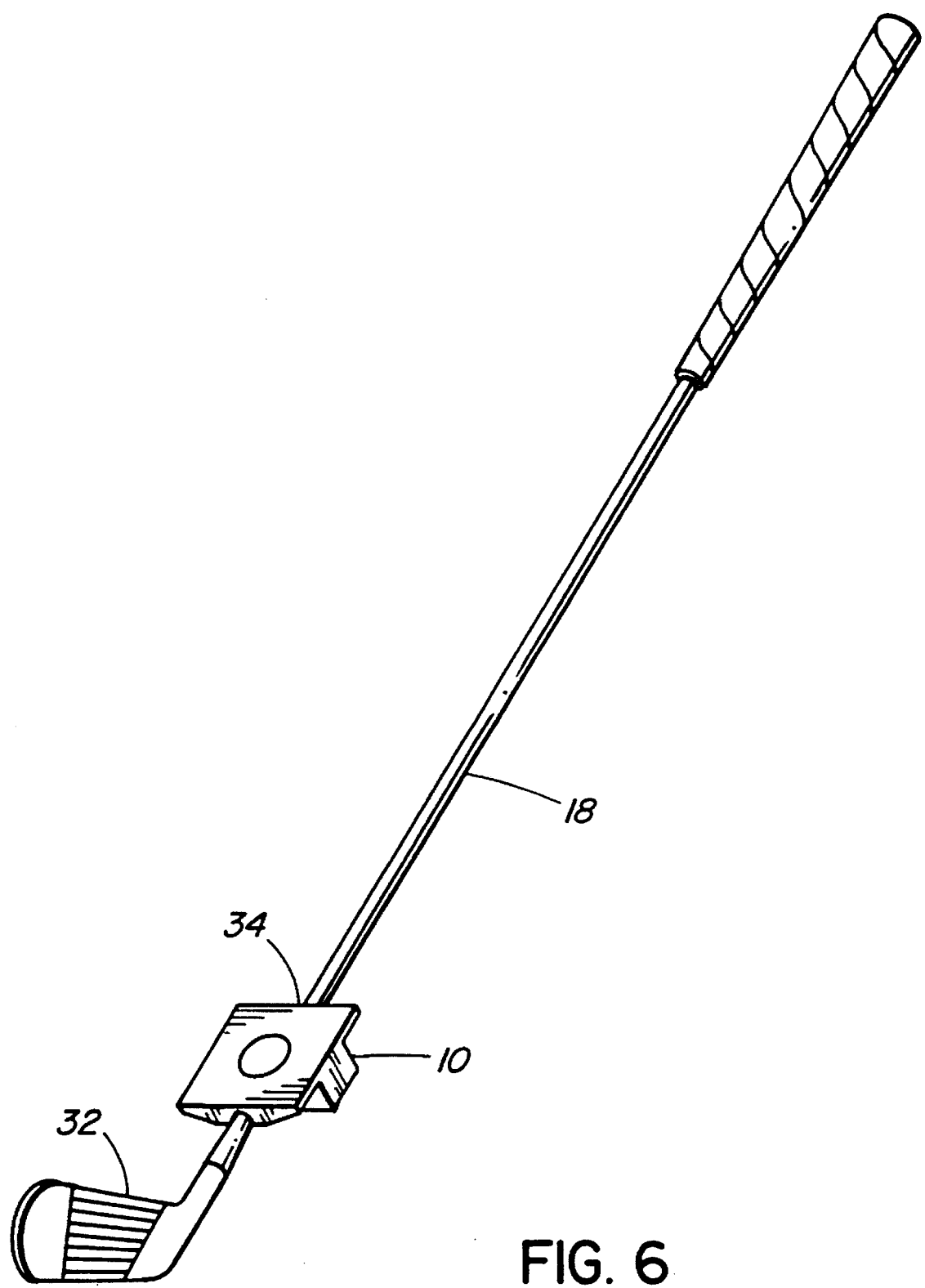
FIG. 6 shows a perspective view of the golf training aid attached to an iron golf club for use.

The training aid device assembly comprises a base member 10 and a shaft engaging jaw 12 secured to each other by a pivot pin 14 at the rear most end of the jaw 12. The base member and jaw 12 define between them a passage way 16 adapted to receive and hold a golf club shaft 18. Grooves 19 extend at right angle to the passage way 16 in the base member 10. A resilient friction member 20 is adapted to be received between the golf club shaft 18 and the jaw 12 and inhibits sliding of the shaft 18 within the passage way 16 relative to the base member 10 and the jaw 12. Channels 22 are provided in both side edges of the jaw 12. A jaw retainer 24 slidably engages the channels 22 of the jaw 12 to prevent opening of the jaw 12. A jaw retainer locking member 26 slides within a channel 27 provided on the upper face of the jaw retainer 24 and into a notch 28 provided in one of the side edges of the jaw 12 thereby ensuring the proper positioning of the jaw retainer 24 relative to the jaw 12. A second locking member 30 includes a peg or pin which inserts into the jaw 12 thereby restricting movement of the jaw retainer 24 together with the jaw retainer locking member 26, once they have been properly positioned, in particular preventing movement of the training aid device during the execution of a golf swing.

In use, the base member 10 is pivotally secured to the shaft engaging jaw 12 by means of the pivot pin 14. The golf club shaft 18 is placed within the passage way 16. The base member 10 is positioned on the golf club shaft 18 so that it is at 90° with the club face 32. If the user so desires marks can be made on the golf club shaft 18 opposite the arrow tabs 34 on either side of the base member 10 so that the aid can be secured again to the golf club without having to make any visual adjustment of the positioning of the base member 10 relative to the club face 32. The resilient friction member 20 is then placed between the shaft engaging jaw 12 and the golf club shaft 18 to prevent movement of the golf club shaft 18 relative to the base member 10 and jaw 12 assembly. The jaw retainer 24 is then slid into the channels 22 of the jaw 12 as well as the grooves 19 of the base member 10. The jaw retainer locking member 26 is then slid into a channel 36 provided in the upper surface of the jaw retainer 24 and slid within the aperture 28 provided in the upper face of the jaw 12. The second locking member 30 is then secured into place in the jaw 12. The device is then ready for use.

In a preferred embodiment, the base member 10 and the shaft engaging jaw 12 are made of metal while the resilient friction member 20 is made of rubber or any other suitably resilient material providing the necessary friction.

While the present invention has been described in connection with a specific embodiment thereof and in a specific use, various modifications will occur to those skilled in the art without departing from the spirit and scope of the invention as set forth in the appended claims. I therefore wish to embody within the scope of the patent which may be granted hereon all such embodiment as reasonably and properly come within the scope of my contribution to the art.

The embodiments of the invention in which an exclusive property or privilege is claimed are defined as follows:

1. A golf swing training device for providing a visual means for visualizing a golf swing arc comprising:

a base member;

a shaft engaging jaw pivotally secured to said base member, said base member and said shaft engaging jaw forming between them a passageway adapted to receive and hold a golf club shaft;

locking means to secure said base member and said shaft engaging jaw in a closed position about said golf club shaft; and a resilient friction member adapted to be received between said golf club shaft and said shaft engaging jaw when the device is in use; and wherein the locking means comprise a jaw retainer adapted to be slidably received by said base member and shaft engaging jaw and adapted to hold said base member and shaft engaging jaw in the closed position about said golf club shaft.

2. The device of claim 1 further comprising means for securing the jaw retainer in contact with the base member and shaft engaging jaw.

3. A golf swing training device for providing a visual means for visualizing a golf swing arc comprising:

a base member;

a shaft engaging jaw pivotally secured to said base member, said base member and said shaft engaging jaw forming between them a passageway adapted to receive and hold a golf club shaft;

locking means to secure said base member and said shaft engaging jaw in a closed position about said golf club shaft; and a resilient friction member adapted to be received between said golf club shaft and said shaft engaging jaw when the device is in use; and wherein the base member includes a flat surface acting as the means for visualizing.

4. The device of claim 3 wherein the golf club shaft is generally parallel to the flat surface when the base member and the engaging jaw are in the closed position about the golf club shaft.

5. The device of claim 3 wherein the flat surface is generally square.

\* \* \* \* \*